United States Patent
Marupaduga (10) Patent No.: US 11,758,447 B1
(45) Date of Patent: *Sep. 12, 2023

(54) CONTROLLING SECONDARY-NODE ADDITION BASED ON COOPERATIVE CONSIDERATION OF COVERAGE COMPARISION AND PREDICTED DATA SPLIT

(71) Applicant: Sprint Spectrum L.P., Overland Park, KS (US)

(72) Inventor: Sreekar Marupaduga, Overland Park, KS (US)

(73) Assignee: Sprint Spectrum LLC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/807,996

(22) Filed: Jun. 21, 2022

Related U.S. Application Data (63) Continuation of application No. 17/247,413, filed on Dec. 10, 2020, now Pat. No. 11,399,319.

(51) Int. Cl.
*H04W 36/00* (2009.01)
*H04W 36/30* (2009.01)
*H04W 36/14* (2009.01)

(52) U.S. Cl.
CPC ....... *H04W 36/0069* (2018.08); *H04W 36/14* (2013.01); *H04W 36/30* (2013.01)

(58) Field of Classification Search
CPC . H04W 76/15; H04W 36/0069; H04W 88/06; H04W 36/08; H04W 36/0027; H04W 36/30; H04W 36/14; H04W 36/28; H04W 36/0085; H04W 36/0058; H04W 36/0094; H04W 36/0077; H04W 36/22; H04W 36/32
See application file for complete search history.

(56) References Cited

U.S. PATENT DOCUMENTS

| | | | |
|---|---|---|---|
| 10,321,513 B2 * | 6/2019 | Shrivastava | ...... H04W 76/28 |
| 10,505,700 B1 | 12/2019 | Lan | |
| 10,827,551 B1 | 11/2020 | Marupaduga et al. | |
| 10,893,562 B1 | 1/2021 | Sung et al. | |

(Continued)

FOREIGN PATENT DOCUMENTS

| | | |
|---|---|---|
| CN | 109699059 | 4/2019 |
| WO | 2022/011500 | 1/2022 |

*Primary Examiner* — Allahyar Kasraian
(74) *Attorney, Agent, or Firm* — McDonnell Boehnen Hulbert & Berghoff LLP (57) ABSTRACT

A mechanism for controlling configuration of dual connectivity for a user equipment device (UE), where the dual connectivity includes the UE being served cooperatively by (i) a first access node over a first air-interface connection between the UE and the first access node and (ii) a second access node over a second air-interface connection between the UE and the second access node. An example method includes (a) predicting whether both (i) in the dual connectivity, a data split will put a threshold greater portion of data flow of the UE on the second air-interface connection than on the first air-interface connection and (ii) coverage strength of the UE from the second access node will be threshold lower than coverage strength of the UE from the first access node and (b) using the prediction as a basis to control whether or not to establish the dual connectivity for the UE.

20 Claims, 4 Drawing Sheets

(56) References Cited

U.S. PATENT DOCUMENTS

| | | |
|---|---|---|
| 11,165,528 B1 | 11/2021 | Mansour et al. |
| 11,265,751 B1 | 3/2022 | Marupaduga |
| 2014/0364128 A1 | 12/2014 | Lee et al. |
| 2016/0157117 A1 | 6/2016 | Pan et al. |
| 2016/0255537 A1* | 9/2016 | Uchino ............. H04W 72/0413 370/329 |
| 2017/0099621 A1 | 4/2017 | Michaelsen et al. |
| 2019/0200406 A1 | 6/2019 | Henttonen et al. |
| 2020/0280901 A1 | 9/2020 | Na |
| 2021/0168887 A1 | 6/2021 | Zhang et al. |
| 2021/0185747 A1 | 6/2021 | Kanamarlapudi et al. |
| 2022/0046475 A1 | 2/2022 | Antonioli et al. |
| 2022/0046554 A1 | 2/2022 | Marupaduga |
| 2022/0053050 A1 | 2/2022 | Wang et al. |
| 2022/0159472 A1* | 5/2022 | Vivanco ................ H04W 76/15 |

\* cited by examiner

CONTROLLING SECONDARY-NODE ADDITION BASED ON COOPERATIVE CONSIDERATION OF COVERAGE COMPARISION AND PREDICTED DATA SPLIT

REFERENCE TO RELATED APPLICATION

This is a continuation of U.S. patent application Ser. No. 17/247,413, filed Dec. 10, 2020, the entirety of which is hereby incorporated by reference.

BACKGROUND

A typical wireless communication system includes a number of access nodes that are configured to provide coverage in which user equipment devices (UEs) such as cell phones, tablet computers, machine-type-communication devices, tracking devices, embedded wireless modules, and/or other wirelessly equipped communication devices (whether or not user operated), can operate. Further, each access node could be coupled with a core network that provides connectivity with various application servers and/or transport networks, such as the public switched telephone network (PSTN) and/or the Internet for instance. With this arrangement, a UE within coverage of the system could engage in air-interface communication with an access node and could thereby communicate via the access node with various application servers and other entities.

Such a system could operate in accordance with a particular radio access technology (RAT), with communications from an access node to UEs defining a downlink or forward link and communications from the UEs to the access node defining an uplink or reverse link.

Over the years, the industry has developed various generations of RATs, in a continuous effort to increase available data rate and quality of service for end users. These generations have ranged from "1 G," which used simple analog frequency modulation to facilitate basic voice-call service, to "4 G"—such as Long Term Evolution (LTE), which now facilitates mobile broadband service using technologies such as orthogonal frequency division multiplexing (OFDM) and multiple input multiple output (MIMO). And recently, the industry has completed initial specifications for "5 G" and particularly "5 G NR" (5 G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each access node could be configured to provide coverage and service on one or more radio-frequency (RF) carriers. Each such carrier could be frequency division duplex (FDD), with separate frequency channels for downlink and uplink communication, or time division duplex (TDD), with a single frequency channel multiplexed over time between downlink and uplink use. And each such frequency channel could be defined as a specific range of frequency (e.g., in RF spectrum) having a bandwidth (width in frequency) and a center frequency and thus extending from a low-end frequency to a high-end frequency.

Further, each carrier could be defined within an industry standard frequency band, by its frequency channel(s) being defined within the frequency band. Examples of such frequency bands include, without limitation, (i) bands 2, 4, 12, 25, 26, 66, 71, and 85, supporting FDD carriers (ii) band 41, supporting TDD carriers, and (iii) bands n258, n260, and n261, supporting FDD and TDD carriers.

The coverage provided by a given access node on a given carrier could also be considered to define a respective "cell". Thus, if an access node provides coverage and service on two carriers, the access node would be providing two cells, one on each carrier. And if two access nodes provide coverage and service on the same carrier as each other, the access nodes would be providing different respective cells than each other, both on the same carrier.

On the downlink and uplink, the coverage of each such cell could define an air interface configured in a specific manner to provide physical resources for carrying information wirelessly between the access node and UEs.

Without limitation, for instance, the air interface could be divided over time into a continuum of frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval, the resource elements on the downlink and uplink could be grouped to define physical resource blocks (PRBs) that the access node could allocate as needed to carry data between the access node and served UEs.

In addition, certain resource elements on the example air interface could be reserved for special purposes. For instance, on the downlink, certain resource elements could be reserved to carry reference signals or the like that UEs could measure in order to determine coverage strength, and other resource elements could be reserved to carry other control signaling such as PRB-scheduling directives and acknowledgement messaging from the access node to UEs. And on the uplink, certain resource elements could be reserved to carry random access signaling from UEs to the access node, and other resource elements could be reserved to carry other control signaling such as PRB-scheduling requests, acknowledgement messaging, and channel-quality reports from UEs to the access node.

OVERVIEW

When a UE enters into coverage of an example network, the UE could detect threshold strong coverage of an access node on a particular carrier, such as by detecting a threshold strong reference signal broadcast by the access node on the carrier. And the UE could then engage in random-access and connection signaling, such as Radio Resource Control (RRC) signaling, with the access node to establish an air-interface connection (e.g., RRC connection) through which the access node will then serve the UE on that carrier. Further, the access node could establish in data storage a context record for the UE, noting the carrier on which the UE is connected and noting associated service information.

In addition, if the UE is not already registered for service with the core network, the UE could transmit to the access node an attach request, which the access node could forward to a core-network controller for processing. And the core-network controller and access node could then coordinate setup for the UE of one or more user-plane bearers, each of which could include (i) an access-bearer portion that extends between the access node and a core-network gateway system that provides connectivity with a transport network and (ii) a data-radio-bearer portion that extends over the air between the access node and the UE.

Once the UE is connected and registered, the access node could then serve the UE in a connected mode over the air-interface connection, managing downlink air-interface communication of packet data to the UE and uplink air-interface communication of packet data from the UE.

For instance, when the core-network gateway system receives user-plane data for transmission to the UE, the data could flow to the access node, and the access node could buffer the data, pending transmission of the data to the UE. With the example air-interface configuration noted above, the access node could then allocate downlink PRBs in an upcoming subframe for carrying at least a portion of the data, defining a transport block, to the UE. And the access node could transmit to the UE in a control region of that subframe a Downlink Control Information (DCI) scheduling directive that designates the allocated PRBs, and the access node could accordingly transmit the transport block to the UE in those designated PRBs.

Likewise, on the uplink, when the UE has user-plane data for transmission on the transport network, the UE could buffer the data, pending transmission of the data to the access node, and the UE could transmit to the access node a scheduling request that carries a buffer status report (BSR) indicating the quantity of data that the UE has buffered for transmission. With the example air-interface configuration noted above, the access node could then allocate uplink PRBs in an upcoming subframe to carry a transport block of the data from the UE and could transmit to the UE a DCI scheduling directive that designates those upcoming PRBs. And the UE could accordingly transmit the transport block to the access node in the designated PRBs.

In addition, when a UE is connected with an access node, the access node might provide the UE with carrier-aggregation service, where the access node serves the UE on a combination of multiple carriers at once, to help provide the UE with increased peak data rate of communication. In an example carrier-aggregation implementation, the multiple carriers on which the access node serves the UE would define a "cell group" including a primary cell (PCell) or primary component carrier (PCC) and one or more secondary cells (SCells) or secondary component carriers (SCCs). To configure carrier-aggregation service when the UE initially connects with the access node or later, the access node could add one or more carriers to the UE's connection, recording the group of carriers in the UE context record and signaling to the UE to prepare the UE to operate accordingly.

With carrier-aggregation configured, the access node could coordinate air-interface communication with the UE on PRBs distributed across the multiple carriers. For instance, with downlink carrier aggregation, the access node could designate in a scheduling directive to the UE one or more downlink PRBs respectively in each of the UE's component carriers and could accordingly transmit data to the UE those PRBs distributed across the carriers. And with uplink carrier aggregation, the access node could designate in a scheduling directive to the UE one or more uplink PRBs respectively in each of the UE's component carriers, and the UE could accordingly transmit data to the access node in those PRBs distributed across the carriers.

When a UE is connected with an access node, the UE may also from time to time report to the access node the UE's coverage strength, e.g., reference signal received power (RSRP), from the access node—perhaps per carrier if the UE is connected on multiple carriers. For instance, the UE may report its RSRP at the time the UE attaches and then periodically and/or in response to one or more trigger conditions, to facilitate controlling service in view of the UE's coverage strength.

Further, as the industry advances from one generation of wireless technology to the next, or in other scenarios, networks and UEs may also support dual-connectivity service, where a UE is served on multiple co-existing connections, perhaps according to different respective RATs.

For instance, a first access node could be configured to provide service according to a first RAT and a second access node could be configured to provide service according to a second RAT, and a UE positioned concurrently within coverage of both the first and second access nodes could have a first radio configured to engage in service according to the first RAT and a second radio configured to engage in service according to the second RAT. The UE may thus be able to establish a first air-interface connection with the first access node according to the first RAT and a second air-interface connection with the second access node according to the second RAT, and the access nodes may then concurrently serve the UE over those connections according to their respective RATs, each in the manner discussed above for instance.

Such dual connectivity (or "non-standalone" (NSA) connectivity) could help to facilitate increased peak data-rate of communications, by multiplexing the UE's communications across the multiple air-interface connections. Further or alternatively, dual connectivity may provide other benefits compared with serving a UE on a single connection (as "standalone" (SA) connectivity) perhaps according to a single RAT.

In a representative dual-connectivity implementation, one of the access nodes could operate as a master node (MN), responsible for coordinating setup, management, and teardown of dual-connectivity service for the UE and functioning as an anchor point for RRC signaling and core-network control signaling related to the dual-connected UE. And each of one or more other access nodes could operate as a secondary node (SN) mainly to provide additional connectivity and increased aggregate bandwidth for the UE.

When the UE enters into coverage of such a system, the UE could initially scan for coverage and discover threshold strong coverage of the MN on a given carrier, and the UE could then responsively engage in signaling as discussed above to establish a primary air-interface connection with the MN on that carrier and to attach with the network. Further, the MN may configure carrier-aggregation service for the UE by adding one or more carriers to the UE's connection with the MN, thus defining for the UE a master cell group (MCG)—with one carrier being a PCell and each other carrier being an SCell. And if the UE supports dual-connectivity service, the MN might then coordinate setup of dual connectivity for the UE.

Coordinating setup of dual connectivity for the UE could involve first determining that the UE is within threshold strong coverage of the SN and then engaging in signaling to coordinate setup for the UE of a secondary air-interface connection between the UE and the SN.

For instance, the MN could first direct the UE to scan for secondary coverage on one or more carriers on which the SN provides service and could receive from the UE a measurement report indicating that the UE detects threshold strong coverage of the SN on one or more such carriers. The MN could then engage in signaling with the SN to arrange for establishment of the secondary connection for the UE on the detected carrier(s), which could define a secondary cell group (SCG) for the UE—with one carrier being designated an SCG primary cell (PSCell) and each other being an SCG secondary cell (SCell). Further, the MN could engage in signaling with the UE to cause the UE to access the SN and complete setup of that secondary connection.

In addition, coordinating setup of dual connectivity for the UE could also involve engaging in signaling, for each of one or more bearers established for the UE, to split the bearer so that the MN and SN can then serve respective portions of the UE's data communications. For instance, the MN could engage in signaling to establish a bearer split at the core-network gateway system, with one access-bearer leg extending between the gateway system and the MN and another access-bearer leg extending between the gateway system and the SN. Alternatively, the MN could engaging signaling to establish a bearer split at the MN, with the UE's access bearer remaining anchored at the MN and a branch of the access bearer extending between the MN and the SN. And still alternatively, the MN could engage in signaling to establish a bearer split at the SN, with the UE's access bearer being transferred to and anchored at the SN and a branch of the access bearer extending between the SN and the MN.

With dual-connectivity so configured by way of example, the MN and SN could then serve the UE with packet-data communications over their respective connections with the UE, with each access node respectively coordinating air-interface communication in the manner described above for instance. In an example implementation, the UE's downlink user-plane data flow would be split between the UE's two connections. For instance, when the core-network gateway system has packet data destined to the UE, that data could flow over a split bearer like one of those noted above, with the MN ultimately receiving a portion of the data and transmitting that portion of data over the UE's primary air-interface connection from the MN to the UE, and with the SN ultimately receiving another portion of the data and transmitting that other portion of data over the UE's secondary air-interface connection from the SN to the UE. Further, the distribution of the UE's downlink user-plane data flow between the UE's connections could be done according to a downlink split ratio. And the MN and/or another controller of the UE's dual-connectivity service could be responsible for configuring that downlink split ratio.

Likewise, the UE's uplink user-plane data flow could also be split between the UE' s two connections. For instance, when the UE has data to transmit on the transport network, the UE could transmit a portion of that data over the UE's primary air-interface connection to the MN, and that data could flow over an access bearer from the MN ultimately to the core-network gateway system for output onto the transport network, and the UE could transmit another portion of the data over the UE's secondary air-interface connection to the SN, and that data could similarly flow over an access bearer from the SN ultimately to the core-network gateway system for output onto the transport network. And analogously here, the distribution of the UE's uplink user-plane data flow between the UE's connections could be done according to an uplink split ratio, and the MN and/or another controller of the UE's dual-connectivity service could similarly be responsible for configuring that uplink split ratio.

For downlink and/or uplink communication with the dual-connected UE, the MN or other controller could determine a data-split ratio based on a comparison of the connections, as to one or more metrics for instance, or based on one or more other factors. For example, the MN could determine the data-split ratio based on a comparison of available data capacity (e.g. PRB availability) of the UE's connections, such as a comparison between (i) a level of available data capacity on the carrier(s) on which the UE is connected with the MN and (ii) a level of available data capacity on the carrier(s) on which the UE is connected with the SN. By way of example, the MN could establish a split ratio that would put a greater portion of the UE's data flow on the connection having a greater available data capacity than the other connection.

The MN could then impose use of that determined data-split ratio. For downlink communication in a scenario where the data split is at the SN, for instance, the MN could signal to the SN to direct and thus cause the SN to apply the determined data-split ratio. And for uplink communication, the MN could signal to the UE to direct and thus cause the UE to apply the determined data-split ratio.

One technical issue that can arise in a practice is that the data-split ratio applied for a dual-connected UE could result in a majority of the UE's data flow being put on the UE's secondary connection in a scenario where the UE's secondary connection is significantly weaker than the UE's primary connection. This could happen, by way of example, where the UE is in strong enough coverage of the SN to justify having the MN set up secondary connectivity for the UE with the SN but where the UE's coverage from the SN is actually threshold lower than the UE's coverage from the MN, and where a metric comparison such as that noted above would result in a majority of the UE's data flow being provided on UE's secondary connection with the SN. Having a majority of the UE's data flow be provided on the UE's threshold weaker connection with the SN, however, might result in sub-par user experience.

The present disclosure provides a technical mechanism to help address this issue. In accordance with the disclosure, when a UE has a first connection with a first access node and where a second connection for the UE could be added with a second access node so that the UE would then be served with dual connectivity cooperatively by the first access node over the first connection and the second access node over the second connection, a computing system will control whether or not to add the second connection for the UE, with the control being based on a cooperative consideration of both (i) a comparison of coverage strength of the UE from the first access node with coverage strength of the UE from the second access node and (ii) a prediction of what data split will be applied for splitting data flow of the UE between the first connection and the second connection.

Without limitation, for instance, this process could apply when the first access node, as MN, receives from the UE a measurement report indicating that the UE is within threshold strong enough coverage of the second access node, as SN, to justify the MN adding for the UE a secondary connection with the SN so that the UE could then be served with dual connectivity cooperatively by the MN and SN.

In that example situation, the MN could then make a determination of whether (i) in the dual connectivity, at least a threshold greater portion of the UE's data flow would be provided on the UE's secondary connection with the SN rather than on the UE's primary connection with the MN and (ii) the UE's RSRP from the SN, though being strong enough to justify adding the secondary connection for the UE, is threshold lower than the UE's RSRP from the MN. If the determination is affirmative, then it could be detrimental to add for the UE the secondary connection with the SN, since the threshold greater portion of the UE's data flow would then be provided on the connection on which the UE has relatively poor coverage compared with the UE's other connection; so in that case, based at least on the determination, the MN could decline to add the secondary connection for the UE. Whereas, if the determination is negative (e.g., because either condition is not met or because both conditions are not met), then, based at least on the determination, the MN could proceed with addition of the secondary connection for the UE.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

An example implementation will now be described in the context of 4 G LTE, 5 G NR, and 4 G-5 G dual connectivity, referred to as EUTRA-NR Dual Connectivity (EN-DC).

With EN-DC, a 4 G access node (4 G evolved Node-B (eNB)) functions as the MN, and a 5 G access node (5 G next-generation Node-B (gNB)) functions the SN. Thus, a UE could first establish a standalone-4 G connection with a 4 G eNB, and the 4 G eNB could then coordinate setup of EN-DC service for the UE, including setup for the UE of a secondary 5 G connection with the 5 G gNB. And the 4 G eNB and 5 G gNB could then concurrently serve the UE over their respective 4 G and 5 G connections with the UE.

Figure 1:
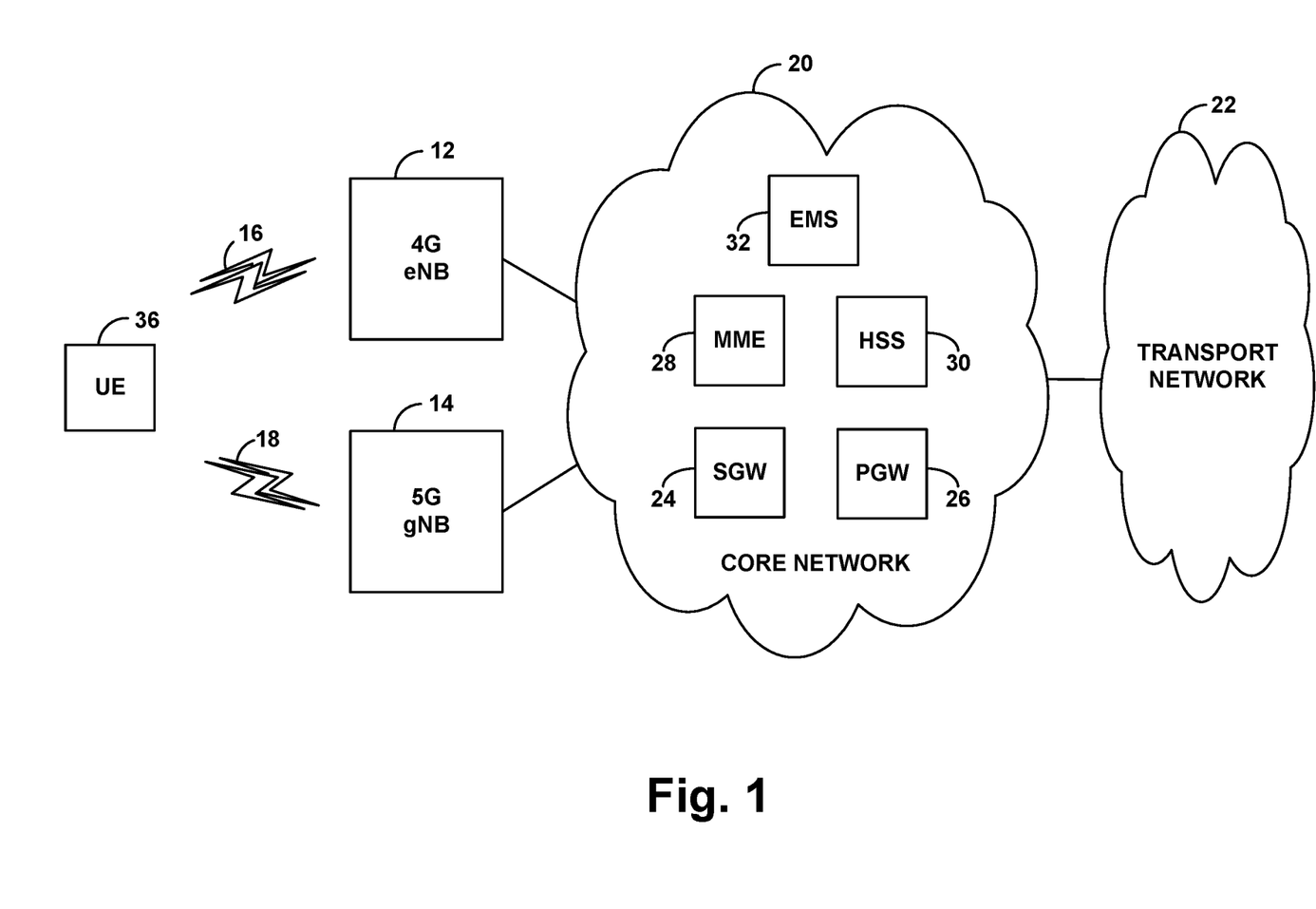
FIG. 1 is a simplified block diagram of an example wireless communication system in which features of the present disclosure can be implemented.

It should be understood, however, that the principles disclosed herein could extend to apply with respect to other scenarios as well, such as with respect to other RATs and other dual-connectivity configurations, including possibly single-RAT dual connectivity and/or dual-connectivity encompassing more than two connections. Further, it should be understood that other variations from the specific arrangements and processes described are possible. For instance, various described entities, connections, functions, and other elements could be added, omitted, distributed, re-located, re-ordered, combined, or changed in other ways. In addition, it will be understood that technical operations disclosed as being carried out by one or more entities could be carried out at least in part by a processing unit programmed to carry out the operations or to cause one or more other entities to carry out the operations Referring to the drawings, FIG. 1 is a simplified block diagram of an example network arrangement having a 4 G eNB 12 and a 5 G gNB 14. Each of these access nodes could be macro access nodes of the type configured to provide a wide range of coverage or could take other forms, such as a small cell access node, a relay, a femtocell access node, or the like, possibly configured to provide a smaller range of coverage. Further, the access nodes could be collocated with each other, e.g., at a common cell site with collocated RF points of origin, or could be separately located. Either way, the access nodes could be optimally configured to provide overlapping coverage in order to support EN-DC service.

Each of these access nodes could also be configured to provide coverage and service on one or more carriers, with the access node's coverage on a given carrier defining a respective cell as noted above. In the example shown, for instance, the 4 G eNB 12 is configured to provide coverage and service on one or more 4 G carriers defining 4 G cells 16, and the 5 G gNB 14 is configured to provide coverage and service on one or more 5 G carriers defining 5 G cells 18. Further, in some cases, the access nodes could be configured to share use of one or more carriers.

Each such carrier could be defined in a given frequency band and could be FDD or TDD. And each carrier could have a respective frequency bandwidth on its downlink and/or uplink. For instance, an FDD carrier could have a respective downlink frequency bandwidth and a respective uplink frequency bandwidth. Whereas, a TDD carrier could have a single channel bandwidth for both downlink and uplink, though the downlink-uplink configuration of the TDD carrier could alternatively be considered to scale down the bandwidth of the carrier respectively on the downlink and uplink based on what percentage of time the carrier is downlink versus uplink.

To facilitate providing service and coverage on the illustrated cells, the access nodes could each have a respective antenna structure, such as an antenna array, that is configured to transmit and receive electromagnetic signals in a region defined by an antenna pattern or radiation pattern, or the access nodes could share portions of a common antenna array for this purpose, among other possibilities. Further, each access node might have a respective set of RF equipment, such as respective antenna elements, and respective antenna ports, jumper cables, filters, amplifiers, and various other components possibly including and/or extending between a radio and the antenna elements, that the access node would use for air-interface communication on one or more carriers.

The air interface on each such cell could be structured as described above by way of example, being divided over time into frames, subframes, and symbol time segments, and over frequency into subcarriers, thus defining an array of air-interface resource elements grouped into PRBs allocable by the access node as noted above, for use to carry data to or from served UEs. Carrier-structure and/or service on the 4 G and 5 G air-interfaces, however, could differ from each other in various ways now known or later developed, such as with one implementing variable subcarrier spacing and the other having fixed subcarrier spacing, with one having flexible TDD configuration and the other having fixed TDD configuration, with one having different subcarrier spacing and/or symbol time segment length than the other, and/or with one making different use of MIMO technologies than the other, among other possibilities.

As further shown in FIG. 1, each of the illustrated access nodes is interfaced with an example core network 20, which provides connectivity with an external transport network 22 such as the Internet for instance. This core network could be a packet-switched network such as an Evolved Packet Core (EPC) network or Next Generation Core (NGC) core network, among other possibilities, supporting virtual-packet tunnels or other interfaces between network nodes. And the core network could include both a user-plane subsystem through which UE bearer communications could flow to and from the transport network 22, and a control-plane subsystem supporting functions such as UE authentication, mobility management, and bearer management, among others.

In the example arrangement as shown, for instance, the core network 20 could be an EPC network including a serving gateway (SGW) 24, a packet data network gateway (PGW) 26, a mobility management entity (MME) 28, a home subscriber server (HSS) 30, and an element management system (EMS) 32, although other arrangements are possible as well. With this arrangement, the 4 G eNB 12 and 5 G gNB 14 could each have an interface with the SGW 24, the SGW 24 could have an interface with the PGW 26, and the PGW 26 could provide connectivity with the transport network 22. Further, the 4 G eNB 12 could have interfaces with the 5 G gNB 14 and with the MME 28, and the MME 28 could have an interface with the SGW 24, to facilitate bearer setup and the like.

Still further, the HSS 30 could store or have access to UE profile records, which could specify service-subscription plans, UE configurations, and/or other such UE capability information, such as whether a UE is EN-DC capable for instance. And the EMS 32 could operate as a central repository of operational data for the wireless communication network and to control and manage operation of various network elements such as the access nodes.

FIG. 1 also depicts an example UE 36 within coverage of the illustrated access nodes. This UE could take any of the forms noted above, among other possibilities. Further, the UE could be equipped with a 4 G LTE radio and a 5 G NR radio, as well as associated circuitry and logic to support 4 G LTE service, 5 G NR service, and EN-DC service.

Upon entering into coverage this example system, the UE could scan for 4 G coverage and could discover threshold strong coverage of a representative 4 G cell 16 provided by 4 G eNB 14. In line with the discussion above, the UE could then responsively engage in random access and RRC signaling with the 4 G eNB 12 to establish a 4 G connection between the UE and the 4 G eNB 12 in that 4 G cell. Further, the 4 G eNB 12 may add one or more other 4 G cells 16 to the UE's 4 G connection to provide the UE with 4 G carrier-aggregation service, perhaps with the cell in which the UE initially connected being the UE's PCell and each other carrier being an SCell. And the 4 G eNB 12 could establish in data storage a context record for the UE as noted above.

In addition, once the UE connects with the 4 G eNB 12, the UE could send to the 4 G eNB 12 an attach request message, which the 4 G eNB 12 could forward to MME 28 for processing. And upon authenticating and authorizing the UE for service, the MME 28 and 4 G eNB 12 could coordinate setup for the UE of at least one user-plane bearer. For instance, the MME 28 could engage in signaling with the 4 G eNB 12 and the SGW 24 to coordinate setup for the UE of an S1-U packet tunnel between the 4 G eNB 12 and the SGW 24, and the SGW 24 could responsively engage in signaling with the PGW 26 to coordinate setup for the UE of an associated S5 packet tunnel between the SGW 24 and the PGW 26. Further, the 4 G eNB 12 could engage in signaling with the UE to establish for the UE an associated data radio bearer.

In addition, in relation to the UE's connection and/or attachment or at another time, the 4 G eNB 12 could obtain capability data that indicates various capabilities of the UE, including the UE's support for EN-DC service. For instance, the 4 G eNB 12 could obtain this capability data from the UE, or the 4 G eNB 12 could obtain this capability data from the MME 28, which could obtain the data from the HSS 30.

As the UE 36 is EN-DC capable, and perhaps responsive to one or more other trigger conditions, the 4 G eNB 12 could then work to establish EN-DC service for the UE.

For instance, first the 4 G eNB 12 could first direct the UE to scan for 5 G coverage, such as by transmitting to the UE an RRC message carrying a "B1" (inter-RAT) measurement object that specifies one or more of the 5 G cells 18 provided by the 5 G gNB 14 and that specifies per 5 G cell a B1 threshold—i.e., an RSRP threshold for deeming 5 G coverage of the cell to be sufficiently strong to justify adding secondary connectivity for the UE. And the UE could accordingly scan for 5 G coverage and detect threshold strong coverage of one or more such 5 G cells 18 and could accordingly transmit to the 4 G eNB 12 a B1 measurement report specifying, for each threshold strong 5 G cell, an identify of the cell and the threshold strong RSRP that the UE detected from the 5 G gNB 14 in the cell.

Operating as the UE's MN (master eNB (MeNB)), the 4 G eNB 12 could then engage in signaling to coordinate establishment for the UE a secondary 5 G connection with the 5 G gNB 14, as the UE's SN (secondary gNB (SgNB)) on the one or more detected/reported 5 G cells 18—perhaps designating one to be PSCell and each other to be an SCell. For example, the 4 G eNB 12 could transmit to the 5 G gNB 14 an SgNB-Addition request to cause the 5 G gNB 14 to allocate resources for a 5 G connection for the UE on the one or more 5 G cells 18, the 4 G eNB 12 could receive an SgNB-Addition-Request acknowledge message from the 5 G gNB 14, and the 4 G eNB 12 could engage in associated RRC signaling with the UE, in response to which the UE could then access and complete establishment of the 5 G connection. Further, the 4 G eNB 12 could add to the UE's context record an indication of the 5 G cell(s) on which the UE is then connected with the 5 G gNB 14. And the 4 G eNB 12 could engage in signaling to establish a split bearer, such to transfer the UE's access bearer (e.g., the UE's S1-U tunnel) to the 5 G gNB 14 and to arrange for a bearer split at the 5 G gNB 14, among other possibilities.

With EN-DC service configured for the UE, the 4 G eNB 12 and 5 G gNB 14 could then cooperatively provide the UE with EN-DC service, by concurrently serving the UE, each over its respective connection with the UE and each in the manner discussed above for instance.

Further, in line with the discussion above, the UE's data flow could be split between the UE's 4 G and 5 G connections. For instance, when the PGW 26 receives user-plane data from the transport network 22 for transmission to the UE, that data could flow over a split access bearer, and the 4 G eNB 12 could transmit a portion of the data over the UE's 4 G connection to the UE, while the 5 G gNB 14 could transmit another portion of the data over the UE's 5 G connection to the UE. And when the UE has user-plane data to transmit on the transport network 22, the UE could transmit a portion of the data over its 4 G connection to the 4 G eNB 12, which could forward the data over an access bearer for transmission directly or indirectly through the core network 20 to the transport network 22, and the UE could transmit another portion of the data over its 5 G connection to the 5 G gNB 14, which could likewise forward the data over an access bearer for transmission directly or indirectly through the core network 20 to the transport network 22.

As discussed above, the 4 G eNB 12, as the UE's MN, could determine what split ratio should be used for the UE's data flow, perhaps respectively for the downlink and for the uplink, and the 4 G eNB 12 could cause the determined data split to be applied. In addition, the 4 G eNB 12 could regularly monitor conditions and update the data split as and when appropriate.

By way of example as noted above, the 4 G eNB 12 could base the data split on a metric comparison between the UE's connections, such as (without limitation) a comparison of available data capacities of the connections. At issue here could be (i) available data capacity on the one or more 4 G cells 16 on which the UE is connected with the 4 G eNB versus (ii) available data capacity on the one or more 5 G cells 18 on which the UE is connected with the 5 G gNB 14. Further, this could be just one of possibly multiple metrics that could (perhaps cooperatively) be the subject of comparison for purposes of establishing the data split. And at issue could be downlink, uplink, or both.

Available data capacity on one or more cells could be represented in various ways. For instance, available data capacity could be represented as an average number of unused (unallocated) PRBs per unit time and/or as an average percentage of PRBs unused per unit time, possibly over a most recent sliding window of time or the like. As to the 4 G eNB's own cells, the 4 G eNB 12 could track this metric itself on a per cell basis. And as to the 5 G gNB's cells, the 5 G gNB 14 could track this metric on a per cell basis and could report this information to the 4 G gNB 12 upon request or periodically, and/or could report this information to another entity, such as the EMS 32, from which the 4 G eNB 12 could then obtain the information.

Without limitation, the 4 G eNB 12 could thus determine a data-split ratio based on a ratio of the connections' available data capacities. For instance, if the UE's 4 G connection has an available data capacity of 25 PRBs per unit time and the UE's 5 G connection has an available data capacity of 50 PRBs per unit time, the 4 G eNB 12 may determine that the split ratio should be 25:50=1:2, i.e., twice as much of the UE's data flow on the UE's 5 G connection as on the UE's 4 G connection.

The 4 G eNB 12 could then impose application of the determined data split for the UE. For instance, as noted above, as to the downlink in the scenario with a split at the 5 G gNB 14, the 4 G eNB 12 could signal to the 5 G gNB 14 to direct and thus cause the 5 G gNB 14 to impose the data split. For instance, the 4 G eNB 12 could transmit to the 5 G gNB 14 a control message specifying the determined data split, and the 5 G gNB 14 could be configured to respond to that control message by applying the specified data split. And as to the uplink, the 4 G eNB 12 could signal to the UE to direct and thus cause the UE to impose the data split. For instance, the 4 G eNB 12 could transmit to the UE a control message specifying the determined data split, and the UE could be configured to respond to that control message by applying the specified data split.

As further discussed above, however, there could be a situation where it may be disadvantageous for the 4 G eNB 12 to add for the UE the 5 G connection on the one or more 5 G cells that the UE determined to be threshold strong enough (per B1 measurement). Namely, if it turns out that the data split that the 4 G eNB 12 would apply for the UE would put at least a threshold greater portion of the UE's data flow on the UE's 5 G connection than on the UE's 4 G connection but the UE's RSRP from the 5 G gNB 14 is threshold lower than the UE's RSRP from the 4 G eNB 12, then it may be detrimental to configure such EN-DC for the UE—as doing so would result in most of the UE's data flow being on the UE's substantively weaker connection.

As noted above, a potential solution to this problem is for a computing system to predict whether that situation would exist and to use that prediction as a basis to proactively control whether or not the 4 G eNB 12 will establish the EN-DC for the UE, e.g. whether the 4 G eNB 12 will add for the UE the secondary 5 G connection with the 5 G gNB 14 on the one or more 5 G cells.

In particular, the computing system could make a prediction of whether both (i) the data split that will apply for the UE will put at least a threshold greater portion of the UE's data flow on the UE's secondary 5 G connection than on the UE's 4 G connection, such as by putting a majority of the UE's data flow on the 5 G connection, and (ii) the UE's 5 G RSRP will be at least as much as a predefined threshold lower than the UE's 4 G RSRP from the 4 G eNB 14.

And if the prediction is that both of those conditions will be met, then, based at least on that prediction, the computing system could cause the 4 G eNB 12 to forgo establishing the EN-DC for the UE, i.e., to not establish EN-DC for the UE with secondary connectivity on the one or more 5 G cells. In that case, the 4 G eNB 12 might altogether forgo establishing EN-DC for the UE. Or the 4 G eNB 12 might instead establish EN-DC for the UE with secondary connectivity on a different set of one or more 5 G cells. Whereas, if the prediction is that at least one of those conditions would not be met, then, based on that prediction, the computing system could allow the 4 G eNB 12 to proceed with establishment of the EN-DC for the UE, with secondary connectivity on the one or more 5 G cells.

This process could be carried out at the time the 4 G eNB 12 is considering establishment of EN-DC for the UE with secondary connectivity on one or more 5 G cells detected/reported by the UE or otherwise identified by the 4 G eNB 12. For instance, the process could be carried out upon receipt by the 4 G eNB 12 of a B1 measurement report (or perhaps multiple such reports per 5 G band) from the UE, reporting that the UE is within threshold strong enough coverage of one or more 5 G cells to justify adding the 5 G cells to provide the UE with secondary connectivity for EN-DC service.

Further, the computing system could be provided by the 4 G eNB 12, such as by a programmed host processor or other processor of the 4 G eNB 12, in which case causing the 4 G eNB 12 to forgo establishing the EN-DC or to proceed with establishing the EN-DC could involve the 4 G eNB 12 causing itself to operate accordingly. Alternatively or additionally, the computing system could be provided elsewhere, such as by the EMS 32, perhaps triggered by signaling from the 4 G eNB 12 when the 4 G eNB is considering establishing EN-DC for the UE, in which case causing the 4 G eNB 12 to forgo establishing the EN-DC or to proceed with establishing the EN-DC could involve transmitting to the 4 G eNB 12 a control message to which the 4 G eNB 12 would respond by causing itself to operate accordingly.

Predicting whether the data split that will apply for the UE will put at least a threshold greater portion of the UE's data flow on the UE's secondary 5 G connection than on the UE's primary 4 G connection could involve predicting the data split that will apply for the UE and determining if that predicted data split will put at least a threshold greater portion of the UE's data flow on the UE's secondary 5 G connection than on the UE's 4 G connection.

Without limitation, predicting the data split ratio between the UE's connections could be done based on records of available data capacity (e.g., on average over a recent sliding window of time) of the cells that would be encompassed respectively by the UE's 4 G connection and the UE's 5 G connection. The computing system could base this prediction on the latest such records or perhaps on records of past available data capacity per time of day to support a prediction of upcoming available data capacity at a given time of day. For instance, based on records as noted above, the computing system could determine an aggregate available data capacity of the one or more 4 G cells on which the UE is connected with the 4 G eNB 12 and an aggregate available data capacity of the one or more 5 G cells on which the UE would be connected with the 5 G gNB 14. And the computing system could predict a data split as a ratio of those available data capacities as discussed above.

The computing system could then determine whether this predicted data split would put a at least a threshold greater portion of the UE's data flow on the UE's secondary 5 G connection than on the UE's primary 4 G connection. At issue here could be simply whether the predicted data split would put a majority of the UE's data flow on the 5 G connection (i.e., more on the 5 G connection than on the 4 G connection). Or at issue could be whether the extent more is at least as high as a predefined threshold defined for present purposes.

Further, predicting whether the UE's 5 G RSRP will be at least threshold lower than the UE's 4 G RSRP could be based on a comparison of the UE's latest B1-reported 5 G RSRP with the UE's latest reported 4 G RSRP. If the UE is connected with an access node on multiple cells, at issue here could be the UE's RSRP on its primary cell (e.g., 4 G PCell or 5 G PSCell), as that primary cell may be an anchor for key control signaling or the like. Thus, the computing system could refer to records of measurement reporting by the UE to determine (i) the UE's most recently reported 4 G RSRP from the 4 G eNB 12 and (ii) the UE's B1-reported RSRP from the 5 G gNB 14. And the computing system could compare those RSRP measures to determine if the UE's 5 G RSRP is at least a predefined threshold extent lower than the UE's 4 G RSRP.

Without limitation, an example B1 measurement threshold for a 5 G cell might be −115 decibel milliwatts (dBm), so the UE may have provided a B1 measurement report for that 5 G cell if the UE detected that the cell's RSRP is at least as high as −114 dBm. But the threshold for comparison of 5 G RSRP with 4 G RSRP might be 5 decibels (dB). So if the UE's latest reported 4 G RSRP is at least as high as −110 dBm (i.e., at least 5 dB higher than the UE's 5 G RSRP), then the computing system could determine and thus predict that the UE's 5 G RSRP will be at least threshold lower than the UE's 4 G RSRP.

Optimally, as noted above, the present process may help to avoid having the UE be served with an EN-DC configuration where a threshold greater portion of the UE's data flow would be provided on a threshold weaker connection. The process may thereby help to provide improved user experience.

Figure 2:
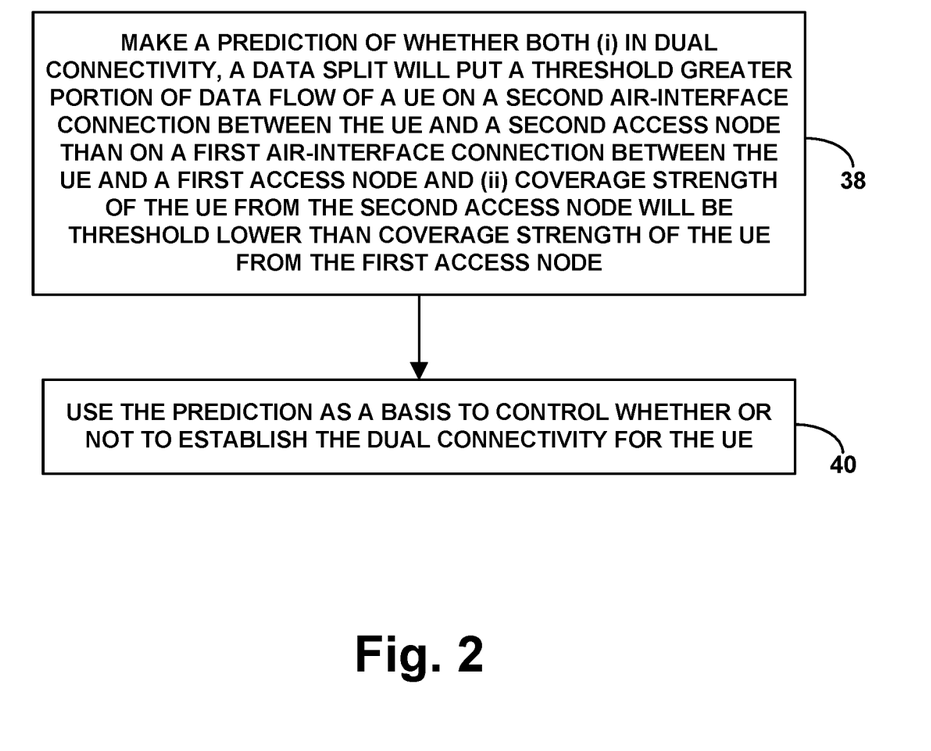
FIG. 2 is a flow chart depicting operations that can be carried out in accordance with the disclosure.

FIG. 2 is a flow chart depicting a method that could be carried out in accordance with the present disclosure, to control configuration of dual connectivity for a UE, where the dual connectivity includes the UE being served cooperatively by (i) a first access node over a first air-interface connection between the UE and the first access node and (ii) a second access node over a second air-interface connection between the UE and the second access node.

As shown in FIG. 2, at block 38, the method includes making a prediction of whether both (i) in the dual connectivity, a data split will put a threshold greater portion of data flow of the UE on the second air-interface connection than on the first air-interface connection and (ii) coverage strength of the UE from the second access node will be threshold lower than coverage strength of the UE from the first access node. And at block 40, the method includes using the prediction as a basis to control whether or not to establish the dual connectivity for the UE.

In line with the discussion above, the act of controlling whether or not to establish the dual connectivity for the UE could involve (i) if the prediction is affirmative, then, based at least on the prediction, causing the dual connectivity to not be established for the UE, whereas (ii) if the prediction is negative, then, based at least on the prediction, allowing the dual connectivity to be established for the UE.

Further, if the prediction is affirmative, the act of causing the dual connectivity to not be established for the UE could involve altogether preventing establishment of dual connectivity for the UE. Or the act of causing the dual connectivity to not be established for the UE could involve preventing establishment of the dual connectivity including the second air-interface connection between the UE and the second access node. For instance, if the dual connectivity would have the second air-interface connection be on a set of one or more cells, the act of causing the dual connectivity to not be established for the UE could involve preventing establishment of the dual connectivity with the second air-interface being on the set of one or more cells, but allowing establishment for the UE of alternate dual connectivity with the second air-interface connection being on a different set of one or more cells.

As further discussed above, to facilitate making the prediction, the method could include predicting whether the data split will put the threshold greater portion of data flow of the UE on the second air-interface connection than on the first air-interface connection. For instance, this could include (a) predicting the data split based at least on a comparison between (i) available data capacity of the first air-interface connection and (ii) availability data capacity of the second air-interface connection and (b) determining whether the predicted data split will put the threshold greater portion of data flow of the UE on the second air-interface connection than on the first air-interface connection.

Further, as noted above, the threshold greater portion could define a majority of the data flow of the UE. Thus, at issue could be whether a majority of the UE's data flow would be provided on the second air-interface connection rather than on the first air-interface connection. Further, as noted above, the analysis could be as to the UE's downlink and/or the UE's uplink.

In addition, as discussed above, to facilitate making the prediction, the method could additionally include predicting whether coverage strength of the UE from the second access node will be threshold lower than coverage strength of the UE from the first access node. For instance, this could include (a) determining, based at least on first measurement reporting from the UE, coverage strength of the UE from the second access node, (b) determining, based at least on second measurement reporting from the UE (separate from or concurrent with the first measurement reporting), coverage strength of the UE from the first access node, (c) comparing the determined coverage strength of the UE from the second access node with the determined coverage strength of the UE from the first access node, and (d) based at least on the comparing, determining whether the determined coverage strength of the UE from the second access node is at least as much as a predefined threshold lower than the determined coverage strength of the UE from the first access node.

As further noted above, this coverage-strength analysis could be with respect to RSRP. And as to an air-interface connection encompassing multiple cells, the analysis could be with respect to coverage strength measured on a primary cell of the connection.

Still further, as noted above, the first air-interface connection could be a 4 G LTE connection, the second air-interface connection could be a 5 G NR connection, and the dual connectivity could be EN-DC.

And yet further, as noted above, the method could be carried out when the UE already has the first air-interface connection, in which case, at issue could be whether to establish for the UE the second air-interface connection. For instance, the method could be carried out by the first access node, and at issue could be whether the first access node should add for the UE the second air-interface connection.

Figure 3:
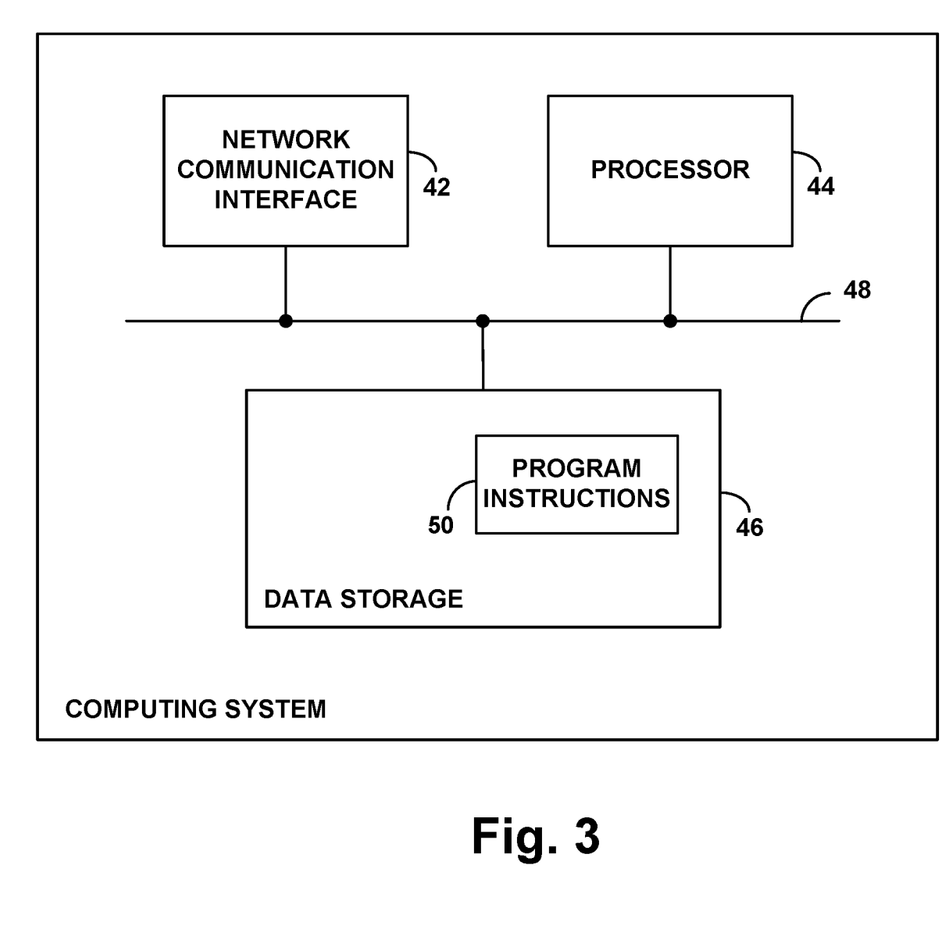
FIG. 3 is a simplified block diagram of an example computing system operable in accordance with the disclosure.

FIG. 3 is next a simplified block diagram of an example computing system that could be operable in accordance with the present disclosure. As noted above, such a computing system could be provided at the first access node in the arrangement of FIG. 1, among other possibilities such as at the EMS 32 for instance.

As shown in FIG. 3, the example computing system includes at least one network communication interface 42, at least one processor 44, and at least one non-transitory data storage 46, which could be integrated together and/or interconnected by a system bus, network, or other connection mechanism 48.

The at least one network communication interface 42 could comprise a physical network connector (e.g., an Ethernet interface) and associated communication logic (e.g., protocol stacks) to facilitate wired or wireless network communication with various other entities. The processor 44 could comprise one or more general purpose processors (e.g., microprocessors) and/or one or more specialized processors (e.g., application specific integrated circuits). And the non-transitory data storage 46 could comprise one or more volatile and/or non-volatile storage components (e.g., magnetic, optical, or flash storage, necessarily non-transitory).

As shown, the at least one non-transitory data storage 46 could then store program instructions 50. These program instructions could be executable by the at least one processor 44 to cause the computing system to carry out various operations described herein, including but not limited to the operations discussed above in relation to FIG. 2.

In example implementation, for instance, the operations could be executable when the UE has the first air-interface connection with the first access node and at issue could be whether to add for the UE a second air-interface connection between the UE and a second access node to enable the UE to be served concurrently by the first access node over the first air-interface connection and the second access node over the second air-interface connection.

The operations could then include (a) making a prediction of whether both (i) in the dual connectivity, a data split will put a majority of data flow of the UE on the second air-interface connection rather than on the first air-interface connection and (ii) coverage strength of the UE from the second access node will be threshold lower than coverage strength of the UE from the first access node, and (b) using the prediction as a basis to control whether or not the second air-interface connection will be added for the UE, such as (i) if the prediction is affirmative, then, based at least on the prediction, preventing the second air-interface connection from being added for the UE, and (ii) if the prediction is negative, then, based at least on the prediction, allowing the second air-interface connection to be added for the UE.

Various other features described herein could be implemented in this context as well, and vice versa. For instance, the method could additionally include making the predictions regarding data split and coverage strength as discussed above.

Figure 4:
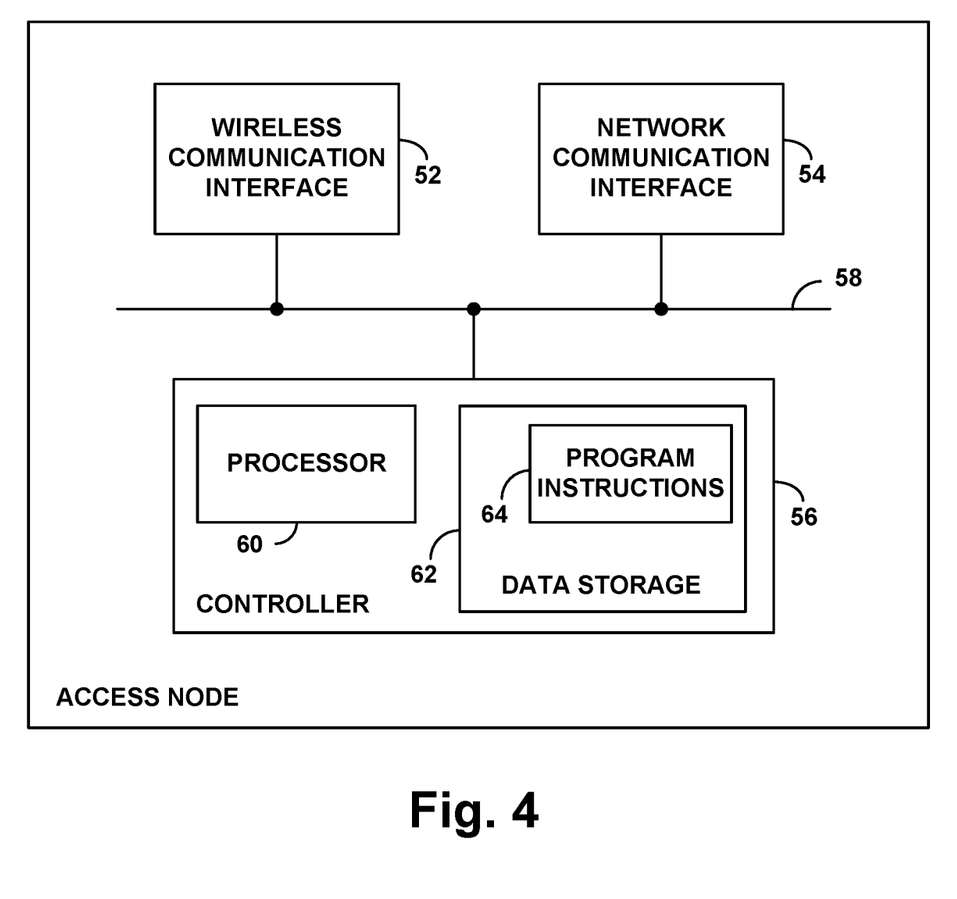
FIG. 4 is a simplified block diagram of an example access node operable in accordance with the disclosure.

FIG. 4 is next a simplified block diagram of an example first access node that could be operable in accordance with the present disclosure to control whether to establish dual connectivity for a UE when the UE has a first air-interface connection between the UE and the first access node, where establishing the dual connectivity includes adding for the UE a second air-interface connection between the UE and a second access node to enable the UE to be served concurrently by the first access node over the first air-interface connection and the second access node over the second air-interface connection.

As shown in FIG. 4, the example first access node includes at least one wireless communication interface 52, at least one backhaul communication interface 54, and at least one controller 56, all of which could be integrated together and/or communicatively linked together by a system bus, network, or other connection mechanism 58.

In an example implementation, the at least one wireless communication interface 52 could comprise an antenna structure, which could be tower mounted or could take other forms, and associated components such as a power amplifier and a wireless transceiver, so as to facilitate providing coverage on one or more carriers and serving the UE over the first air-interface connection. And the at least one backhaul communication interface 54 could comprise network communication interface such as an Ethernet interface, through which the first access node engages in backhaul communication.

Further, the at least one controller 56 could comprise at least one processor 60 (e.g., one or more general purpose processors and/or one or more specialized processors) programmed to cause the first access node to carry out various operations such as those discussed herein. For instance, the at least one controller 56 could comprise at least one non-transitory data storage 62 (e.g., one or more magnetic, optical, or flash storage components, necessarily non-transitory) which could store program instructions 64 executable by the at least one processor to cause the first access node to carry out such operations.

Various other features discussed herein can be implemented in this context as well, and vice versa.

The present disclosure also contemplates at least one non-transitory computer readable medium (e.g., one or more magnetic, optical, of flash storage components, necessarily non-transitory) having stored thereon (e.g., being encoded with) or otherwise containing program instructions executable by a processor to carry out various operations as described herein.

Exemplary embodiments have been described above. Those skilled in the art will understand, however, that changes and modifications may be made to these embodiments without departing from the true scope and spirit of the invention.

What is claimed is:

1. A method for controlling configuration of dual connectivity for a user equipment device (UE), wherein the dual connectivity includes the UE being served cooperatively by (i) a first access node over a first air-interface connection between the UE and the first access node and (ii) a second access node over a second air-interface connection between the UE and the second access node, the method comprising:

making a determination of whether both (i) in the dual connectivity, a data split will put a threshold greater portion of data flow of the UE on the second air-interface connection than on the first air-interface connection and (ii) coverage strength of the UE from the second access node is threshold lower than coverage strength of the UE from the first access node; and using the determination as a basis to control whether or not to establish the dual connectivity for the UE.

2. The method of claim 1, wherein controlling whether or not to establish the dual connectivity for the UE comprises:

if the determination is affirmative, then, based at least on the determination, causing the dual connectivity to not be established for the UE; and if the determination is negative, then, based at least on the determination, allowing the dual connectivity to be established for the UE.

3. The method of claim 2, wherein causing the dual connectivity to not be established for the UE comprises preventing establishment of dual connectivity for the UE.

4. The method of claim 2, wherein causing the dual connectivity to not be established for the UE comprises preventing establishment of the dual connectivity including the second air-interface connection between the UE and the second access node.

5. The method of claim 4, wherein, in the dual connectivity, the second air-interface connection would be on a set of one or more cells, and wherein causing the dual connectivity to not be established for the UE comprises preventing establishment of the dual connectivity with the second air-interface being on the set of one or more cells but allowing establishment for the UE of alternate dual connectivity with the second air-interface connection being on a different set of one or more cells.

6. The method of claim 1, further comprising, to facilitate making the determination, predicting whether the data split will put the threshold greater portion of data flow of the UE on the second air-interface connection than on the first air-interface connection, including:

predicting the data split based at least on a comparison between (i) available data capacity of the first air-interface connection and (ii) availability data capacity of the second air-interface connection; and determining whether the predicted data split will put the threshold greater portion of data flow of the UE on the second air-interface connection than on the first air-interface connection.

7. The method of claim 6, wherein the threshold greater portion defines a majority of the data flow of the UE.

8. The method of claim 6, wherein the data split is as to at least one of a downlink of the UE and an uplink of the UE.

9. The method of claim 1, further comprising, to facilitate making the determination, determining whether coverage strength of the UE from the second access node is threshold lower than coverage strength of the UE from the first access node, including:

determining, based at least on first measurement reporting from the UE, coverage strength of the UE from the second access node;

determining, based at least on second measurement reporting from the UE, coverage strength of the UE from the first access node;

comparing the determined coverage strength of the UE from the second access node with the determined coverage strength of the UE from the first access node; and based at least on the comparing, determining whether the determined coverage strength of the UE from the second access node is at least as much as a predefined threshold lower than the determined coverage strength of the UE from the first access node.

10. The method of claim 9, wherein each coverage strength comprises reference signal receive power.

11. The method of claim 9, wherein each coverage strength is measured on a primary cell.

12. The method of claim 1, wherein the first air-interface connection is a 4 G Long Term Evolution (4 G LTE) connection, the second air-interface connection is a 5 G New Radio (5 G NR) connection, and the dual connectivity is EUTRA-NR Dual Connectivity (EN-DC).

13. The method of claim 1, further comprising carrying out the method when the UE already has the first air-interface connection, wherein at issue is whether to establish for the UE the second air-interface connection.

14. The method of claim 1, wherein the method is carried out by the first access node.

15. A computing system configured to control configuration of dual connectivity for a user equipment device (UE) when the UE has a first air-interface connection between the UE and a first access node, wherein establishing the dual connectivity includes adding for the UE a second air-interface connection between the UE and a second access node to enable the UE to be served concurrently by the first access node over the first air-interface connection and the second access node over the second air-interface connection, the computing system comprising:

a processor;

non-transitory data storage; and program instructions stored in the non-transitory data storage and executable by the processor to cause the computing system to carry out operations including:

making a determination of whether both (i) in the dual connectivity, a data split will put a majority of data flow of the UE on the second air-interface connection rather than on the first air-interface connection and (ii) coverage strength of the UE from the second access node is threshold lower than coverage strength of the UE from the first access node, and using the determination as a basis to control whether or not the second air-interface connection will be added for the UE.

16. The computing system of claim 15, wherein controlling whether or not the second air-interface connection will be added for the UE comprises:

if the determination is affirmative, then, based at least on the determination, preventing the second air-interface connection from being added for the UE; and if the determination is negative, then, based at least on the determination, allowing the second air-interface connection to be added for the UE.

17. The computing system of claim 15, wherein the operations include, to facilitate making the determination, predicting whether the data split will put the majority of the data flow of the UE on the second air-interface connection rather than on the first air-interface connection, including:

predicting the data split based at least on a comparison between (i) available data capacity of the first air-interface connection and (ii) availability data capacity of the second air-interface connection; and determining whether the predicted data split will put the majority of the data flow of the UE on the second air-interface connection rather than on the first air-interface connection.

18. The computing system of claim 15, wherein the operations include, to facilitate making the determination, determining whether coverage strength of the UE from the second access node is threshold lower than coverage strength of the UE from the first access node, including:
- determining, based at least on first measurement reporting from the UE, coverage strength of the UE from the second access node;
- determining, based at least on second measurement reporting from the UE, coverage strength of the UE from the first access node;
- comparing the determined coverage strength of the UE from the second access node with the determined coverage strength of the UE from the first access node; and
- based at least on the comparing, determining whether the determined coverage strength of the UE from the second access node is at least as much as a predefined threshold lower than the determined coverage strength of the UE from the first access node.

19. A first access node operable to control whether to establish dual connectivity for a user equipment device (UE) when the UE has a first air-interface connection between the UE and the first access node, wherein establishing the dual connectivity includes adding for the UE a second air-interface connection between the UE and a second access node to enable the UE to be served concurrently by the first access node over the first air-interface connection and the second access node over the second air-interface connection, the first access node comprising:
- at least one wireless communication interface including an antenna structure through which to serve the UE over the first air-interface connection;
- at least one backhaul communication interface through which to engage in backhaul communication; and
- at least one controller, wherein the at least one controller is configured to cause the first access node to carry out operations including:
  - making a determination of whether both (i) in the dual connectivity, a data split will put a majority of data flow of the UE on the second air-interface connection rather than on the first air-interface connection and (ii) coverage strength of the UE from the second access node is threshold lower than coverage strength of the UE from the first access node, and
  - using the determination as a basis to control whether or not to add the second air-interface connection for the UE, wherein the control includes (i) if the determination is affirmative, then, based at least on the determination, not adding the second air-interface connection for the UE and (ii) if the determination is negative, then, based at least on the determination, adding the second air-interface connection for the UE.

20. The first access node of claim 19, wherein the at least one controller comprises at least one processor, at least one non-transitory data storage, and program instructions stored in the at least one non-transitory data storage and executable by the at least one processor to cause the first access node to carry out the operations.

\* \* \* \* \*